United States Patent
Zhou (10) Patent No.: US 11,950,281 B2
(45) Date of Patent: Apr. 2, 2024

(54) METHOD AND DEVICE FOR TRANSMITTING DATA

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 529 days.

(21) Appl. No.: 17/272,788

(22) PCT Filed: Sep. 6, 2018

(86) PCT No.: PCT/CN2018/104365
§ 371 (c)(1),
(2) Date: Mar. 2, 2021

(87) PCT Pub. No.: WO2020/047799
PCT Pub. Date: Mar. 12, 2020

(65) Prior Publication Data
US 2021/0219342 A1    Jul. 15, 2021

(51) Int. Cl.
*H04W 4/00* (2018.01)
*H04W 72/0446* (2023.01)
(Continued)

(52) U.S. Cl.
CPC ... *H04W 74/0808* (2013.01); *H04W 72/0446* (2013.01); *H04W 72/0453* (2013.01)

(58) Field of Classification Search
CPC ......... H04W 74/0808; H04W 72/0446; H04W 72/0453; H04W 72/53
See application file for complete search history.

(56) References Cited

U.S. PATENT DOCUMENTS 10,257,764 B2 * 4/2019 Oh .................. H04W 16/14
10,257,856 B2 * 4/2019 Park ................ H04W 74/08
(Continued)

FOREIGN PATENT DOCUMENTS

CN   105848165 A   8/2016
CN   105991272 A   10/2016
(Continued)

OTHER PUBLICATIONS

Combined Chinese Office Action and Serarch Report dated Sep. 30, 2022 in Chinese Patent Application No. 2018800012683.3 (with English translation), 12 pages.
(Continued)

*Primary Examiner* — Stephen M D Agosta
(74) *Attorney, Agent, or Firm* — Oblon, McClelland, Maier & Neustadt, L.L.P.

(57) ABSTRACT

Aspects of the disclosure provide a method of transmitting data, including monitoring a data transmission of a first base station in a preset license before talk (LBT) time-frequency region in at least one fixed frame period (FFP). The preset LBT time-frequency region includes at least one time-frequency sub-region. The method can further include determining FFP transmission mode information of the first base station based on a monitoring result on each time-frequency sub-region in the preset LBT time-frequency region in each FFP, and determining an FFP transmission mode of the first base station based on the FFP transmission mode information.

18 Claims, 4 Drawing Sheets

(51) Int. Cl.
*H04W 72/0453* (2023.01)
*H04W 74/0808* (2024.01)

(56) References Cited

U.S. PATENT DOCUMENTS

| | | | |
|---|---|---|---|
| 10,485,027 B2 * | 11/2019 | Mallik | H04W 74/0816 |
| 10,492,222 B2 * | 11/2019 | Kim | H04W 16/14 |
| 10,582,536 B2 * | 3/2020 | Dinan | H04L 5/0007 |
| 10,764,913 B2 * | 9/2020 | Yerramalli | H04W 72/1268 |
| 10,805,953 B2 * | 10/2020 | Babaei | H04W 74/0808 |
| 11,178,690 B2 * | 11/2021 | Wu | H04W 16/14 |
| 11,395,250 B2 * | 7/2022 | Fan | H04W 72/0446 |
| 2014/0056282 A1 | 2/2014 | Sun et al. | |
| 2014/0278139 A1 | 9/2014 | Hong et al. | |
| 2015/0016434 A1 | 1/2015 | Luo et al. | |
| 2015/0245327 A1 | 8/2015 | Damnjanovic et al. | |
| 2015/0245411 A1 * | 8/2015 | Damnjanovic | H04W 74/08 370/328 |
| 2016/0050667 A1 * | 2/2016 | Papasakellariou | H04W 52/0251 370/329 |
| 2016/0192396 A1 * | 6/2016 | Ng | H04W 72/23 370/329 |
| 2016/0270100 A1 * | 9/2016 | Ng | H04L 5/008 |
| 2016/0308636 A1 | 10/2016 | Deng et al. | |
| 2016/0330630 A1 * | 11/2016 | Yoo | H04L 1/0003 |
| 2016/0374059 A1 * | 12/2016 | Park | H04W 74/0808 |
| 2017/0093620 A1 * | 3/2017 | Um | H04L 5/0048 |
| 2017/0251494 A1 | 8/2017 | Li et al. | |
| 2017/0318607 A1 * | 11/2017 | Tiirola | H04W 4/10 |
| 2017/0325253 A1 | 11/2017 | Wang et al. | |
| 2017/0339588 A1 * | 11/2017 | Moon | H04W 24/08 |
| 2018/0176944 A1 | 6/2018 | Wang et al. | |
| 2018/0227082 A1 | 8/2018 | Harada et al. | |
| 2018/0279366 A1 * | 9/2018 | Harada | H04W 74/0808 |
| 2018/0295523 A1 * | 10/2018 | Mallik | H04L 5/003 |
| 2018/0317244 A1 * | 11/2018 | Um | H04W 72/23 |
| 2018/0323917 A1 * | 11/2018 | Um | H04W 72/23 |
| 2018/0351704 A1 * | 12/2018 | Papasakellariou | H04L 5/0053 |
| 2019/0349979 A1 * | 11/2019 | Park | H04W 24/10 |

FOREIGN PATENT DOCUMENTS

| | | |
|---|---|---|
| CN | 106031281 A | 10/2016 |
| CN | 106160962 A | 11/2016 |
| CN | 106162658 A | 11/2016 |
| CN | 106470502 A | 3/2017 |
| CN | 107079494 A | 8/2017 |
| CN | 107926042 A | 4/2018 |
| CN | 105009667 B | 6/2019 |
| CN | 107079483 B | 5/2020 |
| CN | 106664585 B | 9/2020 |
| WO | WO 2018/028271 A1 | 2/2018 |

OTHER PUBLICATIONS

International Search Report and Written Opinion dated Jun. 5, 2019 in PCT/CN2018/104365 filed on Sep. 6, 2018, 7 total pages.
Combined Chinese Office Action and Search Report dated May 31, 2023, in corresponding Chinese Patent Application No. 201880001268.3 (with English Translation of Category of Cited Documents) 9 pages.
Combined Chinese Office Action and Search Report dated Jul. 28, 2023, in corresponding Chinese Patent Application No. 201880001268.3 (with English Translation of Category of Cited Documents) 5 pages.
Jungeng Shi et al., 3GPP LAA-LTE Physical Layer Key Technology Standardization Study, Telecommunications Network Technology No. 12, Developing Strategy, Dec. 15, 2015, entire document, English translation of the abstract.
ITL Inc., R1-150490, Frame structure design for LAA with LBT, 3GPP tsg_ran\WG1_RL1, TSGR1_80, Feb. 18, 2015, entire document.
Qualcomm Incorporated, R1-1809479 7.2.2.4.1 Channel access procedures for NR unlicensed, 3GPP tsg_ran\wg1_rl1, Aug. 17, 2018, entire document.
Interdigital Communications, R1-150541, Design considerations on LTE LAA DL+UL mode, 3GPP tsg_ran\WG1_RL1,TSGR1_80, Feb. 18, 2015, entire document.

* cited by examiner

METHOD AND DEVICE FOR TRANSMITTING DATA

CROSS-REFERENCE TO RELATED APPLICATIONS

This application is a national phase application based on PCT/CN2018/104365, filed on Sep. 6, 2018, the content of which is incorporated herein by reference.

TECHNICAL FIELD

The present disclosure relates to the field of communication technologies, including to a method and device for transmitting data.

BACKGROUND

The fifth-generation mobile communication technology (5G) New Radio (NR), as an important application scenario in the 5G field, is capable of transmitting data by using an unlicensed frequency band. The unlicensed frequency band refers to a frequency band that can be used for free without authorization as, for example, the common Wi-Fi runs in the unlicensed frequency band. Since the unlicensed frequency band is not regulated by the network deployed by the operator, adjacent base stations interfere with each other during transmitting data. In order to avoid the interferences from the adjacent base stations, the base station may monitor a channel partitioned from the unlicensed frequency band by a listen before talk (LBT) mechanism before transmitting data through this channel, and then transmits data through this channel if monitoring confirms that this channel is not occupied by other base stations.

SUMMARY

The present disclosure provides a method and device for transmitting data. According to a first aspect of the disclosure, a method for transmitting data is provided. The method can include, at a side of a device for transmitting data, monitoring a data transmission of a first base station in a preset listen before talk (LBT) time-frequency region in at least one fixed frame period (FFP), wherein the preset LBT time-frequency region includes at least one time-frequency sub-region, and determining FFP transmission mode information of the first base station based on a monitoring result on each time-frequency sub-region in the preset LBT time-frequency region in each FFP, wherein the FFP transmission mode information is in correspondence to a combination of occupancy states of respective time-frequency sub-regions in the preset LBT time-frequency region in the at least one FFP, and the occupancy state refers to a state in which it is monitored that the first base station is performing the data transmission. The method can further include determining an FFP transmission mode of the first base station based on the FFP transmission mode information.

According to a second aspect of the disclosure, a device for transmitting data is provided. The device can include a processor and a memory that is configured to store at least one instruction executable by the processor. The processor can perform a method for transmitting data that includes monitoring a data transmission of a first base station in a preset LBT time-frequency region in at least one FFP. The preset LBT time-frequency region includes at least one time-frequency sub-region. The method can further include determining FFP transmission mode information of the first base station based on a monitoring result on each time-frequency sub-region in the preset LBT time-frequency region in each FFP. The FFP transmission mode information is in correspondence to a combination of occupancy states of respective time-frequency sub-regions in the preset LBT time-frequency region in the at least one FFP, and the occupancy state refers to a state in which it is monitored that the first base station is performing the data transmission. The method can further include determining an FFP transmission mode of the first base station based on the FFP transmission mode information.

It should be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the description, illustrate exemplary embodiments consistent with the present disclosure and, together with the description, serve to explain the principles of the present disclosure.

DETAILED DESCRIPTION

Exemplary embodiments are described in detail herein, and examples thereof are embodied in the accompanying drawings. Where the description hereinafter relates to the accompanying drawings, unless otherwise specified, identical reference numerals in the accompanying drawings denote identical or like elements. Implementation manners described in the following exemplary embodiments do not necessarily represent all the implementation manners consistent with the present disclosure. On the contrary, these implementation manners are merely examples illustrating apparatuses and methods according to some aspects of the present disclosure, as described in the appended claims.

In case where a channel in the unlicensed frequency band is used for data transmission, base stations may be divided into two types depending on the transmission mechanism, namely, load based equipment (LBE) base stations and frame based equipment (FBE) base stations. The LBE base stations perform dynamic scheduling according to load requirements, and occupy a channel with dynamic time and length. Although with more flexible resource scheduling, the LBE base stations are extremely complex in a scheduling mechanism, which is not conductive to their applications. The FBE base stations perform scheduling within a fixed period, and are easier to control although with less flexible scheduling methods. Consequently, the FEB base stations have been widely applied in the field of communication.

In consideration of the services of different FBE base stations, each FBE base station needs to be configured with a different fixed frame period (FFP). When adjacent FBE base stations transmit data based on the LBT mechanism, different FFPs may affect each other. For example, after one FBE base station is configured with a FFP, another FBE base station, if configured with a conflicting FFP, may fail in monitoring during LBT, which affects the data transmission. Therefore, there is an urgent need of a new method for transmitting data in order to improve the success rate of the FBE base stations in data transmission.

Figure 1:
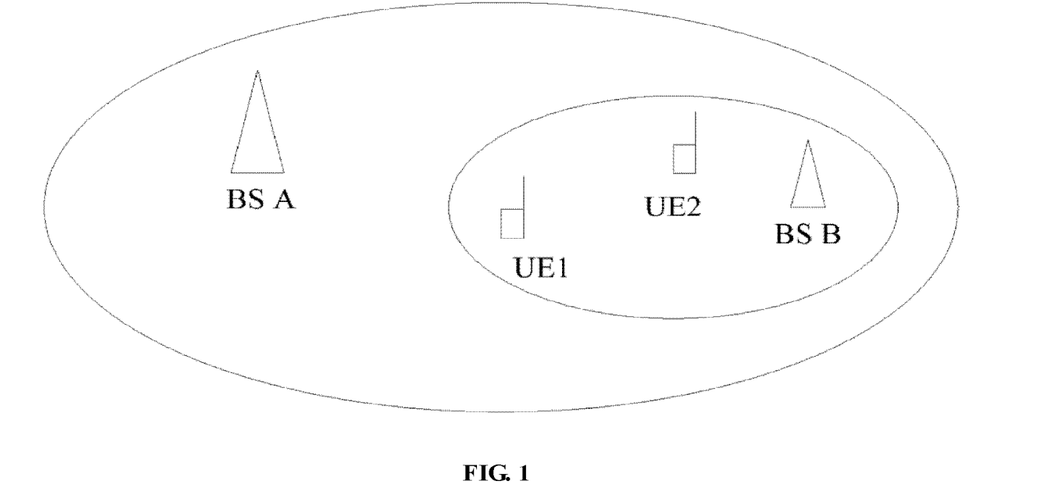
FIG. 1 illustrates an implementation environment involved by a method for transmitting data according to an exemplary embodiment.

Referring to FIG. 1, it illustrates an implementation environment involved in the method for transmitting data according to an embodiment of the present disclosure. The implementation environment can include a base station A and a base station B.

The base station A is adjacent to the base station B, and both of them may be macro base stations or micro base stations. The base station A includes a terminal 1 and is configured to provide various communication services to the terminal 1, and the base station B includes terminal 2 and is configured to provide various communication services to the terminal 2.

Figure 2:
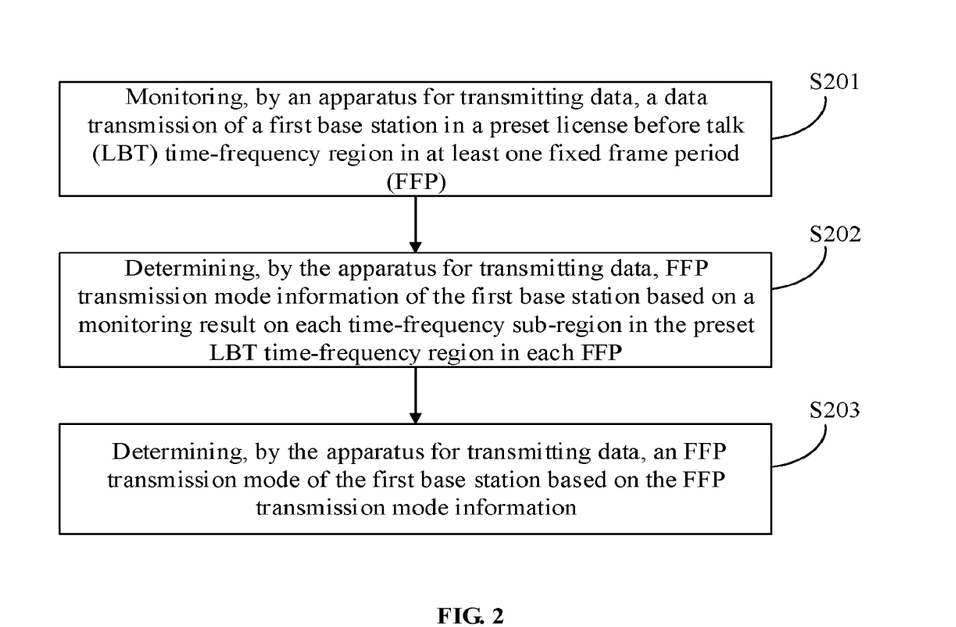
FIG. 2 illustrates a flowchart of a method for transmitting data according to an exemplary embodiment.

FIG. 2 illustrates a flowchart of a method for transmitting data according to an exemplary embodiment. As shown in FIG. 2, the method for transmitting data is applicable to an apparatus for transmitting data. The method for transmitting data includes the following steps.

In step S201, an apparatus for transmitting data monitors a data transmission of the first base station in the preset LBT time-frequency region in the at least one FFP. The present LBT time-frequency region includes at least one time-frequency sub-region.

In step S202, the apparatus for transmitting data determines FFP transmission mode information of the first base station based on a monitoring result on each time-frequency sub-region in the preset LBT time-frequency region in each FFP. The FFP transmission mode information is in correspondence to a combination of occupancy states of respective time-frequency sub-regions in the preset LBT time-frequency region in the at least one FFP, and the occupancy state refers to a state in which it is monitored that the first base station is performing the data transmission.

In step S203, the apparatus for transmitting data determines an FFP transmission mode of the first base station based on the FFP transmission mode information. According to the method provided by the embodiments of the present disclosure, the FFP transmission mode information of the first base station is determined by monitoring the data transmission of the first base station in the preset LBT time-frequency region in at least one FFP, and the FFP transmission mode of the first base station is determined according to the FFP transmission mode information. With the method, the FFP transmission mode of other adjacent base stations can be acquired without signaling interaction between the base stations, such that transmission scheduling is enabled in a fashion of interference avoidance.

In another embodiment of the present disclosure, the apparatus for transmitting data includes a second base station or a terminal in the second base station, and the second base station is a base station that is adjacent to the first base station and interferes with the first base station.

In another embodiment of the present disclosure, before the apparatus for transmitting data monitors the data transmission of the first base station in the preset LBT time-frequency region in the at least one FFP, the method further includes time-synchronizing the apparatus for transmitting data with the first base station in advance.

In another embodiment of the present disclosure, the determining, by the apparatus for transmitting data, the FFP transmission mode information of the first base station based on the monitoring result on each time-frequency sub-region in the preset LBT time-frequency region in each FFP includes determining, by the apparatus for transmitting data, the combination of occupancy states of respective time-frequency sub-regions in the preset LBT time-frequency region in the at least one FFP according to a preset rule and based on the monitoring result on each time-frequency sub-region in the preset LBT time-frequency region in each FFP. The preset rule is intended to indicate a corresponding relationship between the monitoring results on the respective time-frequency sub-regions in the preset LBT time-frequency region in the at least one FFP and the combination of the occupancy states of the respective time-frequency sub-regions in the preset LBT time-frequency region in the at least one FFP. Additionally, the method can include determining the FFP transmission mode information of the first base station according to the combination of the occupancy states of the respective time-frequency sub-regions in the preset LBT time-frequency region in the at least one FFP.

In another embodiment of the present disclosure, the FFP transmission mode information includes one-dimensional FFP transmission mode information, two-dimensional FFP transmission mode information, and two-dimensional extension FFP transmission mode information. The one-dimensional FFP transmission mode information is intended to characterize the combination of the occupancy states of time-frequency sub-regions with the same relative position in the preset LBT time-frequency region in the at least one FFP and in the same frequency band, of the first base station.

The two-dimensional FFP transmission mode information is intended to characterize the combination of the occupancy states of time-frequency sub-regions with the same relative position in the preset LBT time-frequency region in the at least one FFP and in at least two frequency bands, of the first base station, or the two-dimensional FFP transmission mode information is intended to characterize the combination of the occupancy states of time-frequency sub-regions with different relative positions in the preset LBT time-frequency region in the at least one FFP and in the same frequency band, of the first base station.

The two-dimensional extension FFP transmission mode information is intended to characterize the combination of the occupancy states of time-frequency sub-regions with different relative positions in the preset LBT time-frequency region in the at least one FFP and in at least two frequency bands, of the first base station.

In another embodiment of the present disclosure, determining, by the apparatus for transmitting data, the FFP transmission mode of the first base station based on the FFP transmission mode information can include acquiring, by the apparatus for transmitting data, the FFP transmission mode of the first base station by mapping according to a preset mapping relationship and based on the FFP transmission mode information, wherein the preset mapping relationship is intended to indicate a corresponding relationship between the FFP transmission mode information and the FFP transmission mode.

In another embodiment of the present disclosure, when the apparatus for transmitting data is the terminal in the second base station, the method further can include sending, by the apparatus for transmitting data, the FFP transmission mode information to the second base station, wherein the second base station determines the FFP transmission mode of the first base station based on the FFP transmission mode information and adjust an FFP transmission mode of the second base station according to the FFP transmission mode of the first base station, or sending, by the apparatus for transmitting data, the FFP transmission mode of the first base station to the second base station. The second base station adjusts the FFP transmission mode of the second base station according to the FFP transmission mode of the first base station.

In another embodiment of the present disclosure, when the apparatus for transmitting data is the terminal in the second base station, after determining, by the apparatus for transmitting data, the FFP transmission mode of the first base station based on the FFP transmission mode information, the method further can include adjusting, by the apparatus for transmitting data, a data transmission request sent to the second base station according to the FFP transmission mode of the first base station.

In another embodiment of the present disclosure, when the apparatus for transmitting data is the second base station, after determining, by the apparatus for transmitting data, the FFP transmission mode of the first base station based on the FFP transmission mode information, the method can further include determining, by the apparatus for transmitting data, an FFP transmission mode of the second base station according to the FFP transmission mode of the first base station.

In another embodiment of the present disclosure, the preset LBT time-frequency region includes at least one frequency band, and the at least one frequency band includes a carrier component (CC) frequency band, a bandwidth part (BWP) frequency band or a resource block (RB).

In another embodiment of the present disclosure, the FFP transmission mode of the first base station includes an FFP uplink transmission mode, an FFP downlink transmission mode, and an FFP uplink and downlink transmission mode.

All the optional technical solutions above may be used in any combination to form optional embodiments of the present disclosure, and the details are not repeated here.

Figure 3:
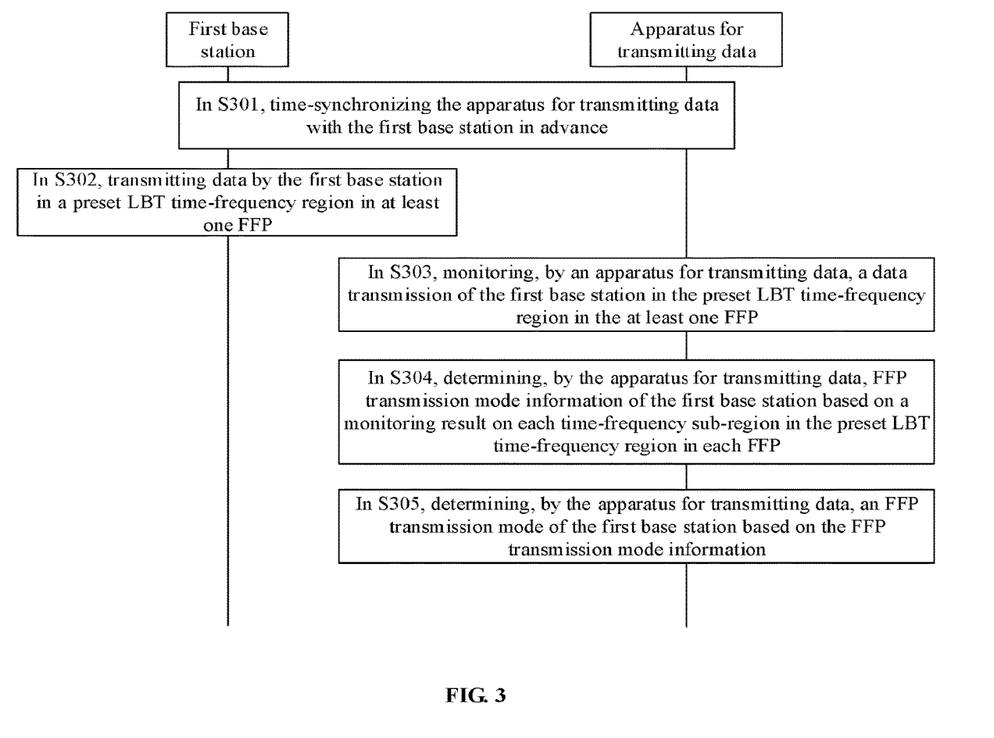
FIG. 3 illustrates a flowchart of a method for transmitting data according to another exemplary embodiment.

FIG. 3 illustrates a flowchart of a method for transmitting data according to an exemplary embodiment. As shown in FIG. 3, the method for transmitting data is applicable to an apparatus for transmitting data. The apparatus for transmitting data includes a second base station or a terminal in the second base station. The method for transmitting data includes the following steps.

In step S301, the apparatus for transmitting data is time-synchronized with the first base station in advance. The apparatus for transmitting data includes a second base station or a terminal in the second base station, the second base station is a base station that is adjacent to the first base station and interferes with the base station. The apparatus for transmitting data needs to be time-synchronized with the first base station before transmitting data. The time-synchronizing refers to synchronous alignment between two adjacent base stations, or a synchronization process in which two base stations acquire a time difference of FFP between each other.

Further, in order to determine the FFP transmission mode of the first base station better, the second base station may also number the respective FFPs of the first base station based on the acquired time difference of FFP between the second base station and the first base station, such that a data transmission process of the first base station in the FFP can be monitored, thereby enabling the acquisition of a relative position and number of the current FFP in which the data transmission is performed. For example, three adjacent FFPs are sequentially numbered as FFP0, FFP1, and FFP2 in FIGS. 4, 5 and 6.

In S302, the first base station transmits data in a preset LBT time-frequency region in at least one FFP. Based on the preset FFP, whenever the FFP is reached, the first base station transmits data in the preset LBT time-frequency region in the FFP according to a preset time-frequency mode. In the embodiments of the present disclosure, transmitting data according to the preset time-frequency mode refers to that the first base station transmits data in different time and in sub-regions of different frequency bands.

The data transmitted by the first base station is valid data or any invalid interference data, which is not specifically limited in the embodiments of the present disclosure. The preset LBT time-frequency region is an idle region of the first base station in the FFP, and includes at least one frequency band, and the at least one frequency band includes a CC frequency band, a BWP frequency band, or an RB. The preset LBT time-frequency region is typically partitioned into at least one time-frequency sub-region which is configured to monitor a data transmission of the first base station by the apparatus for transmitting data.

In S303, the apparatus for transmitting data, monitors a data transmission of the first base station in the preset LBT time-frequency region in the at least one FFP.

Figure 4:
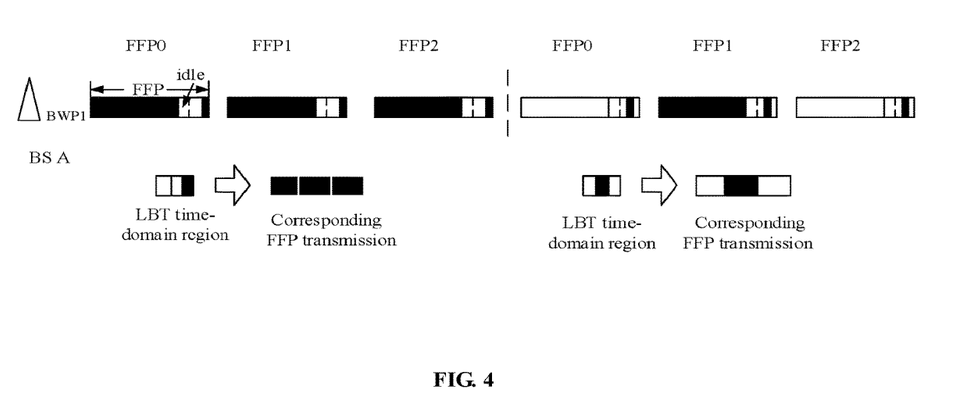
FIG. 4 illustrates a schematic diagram of one-dimensional FFP transmission mode information according to an exemplary embodiment.
Figure 5:
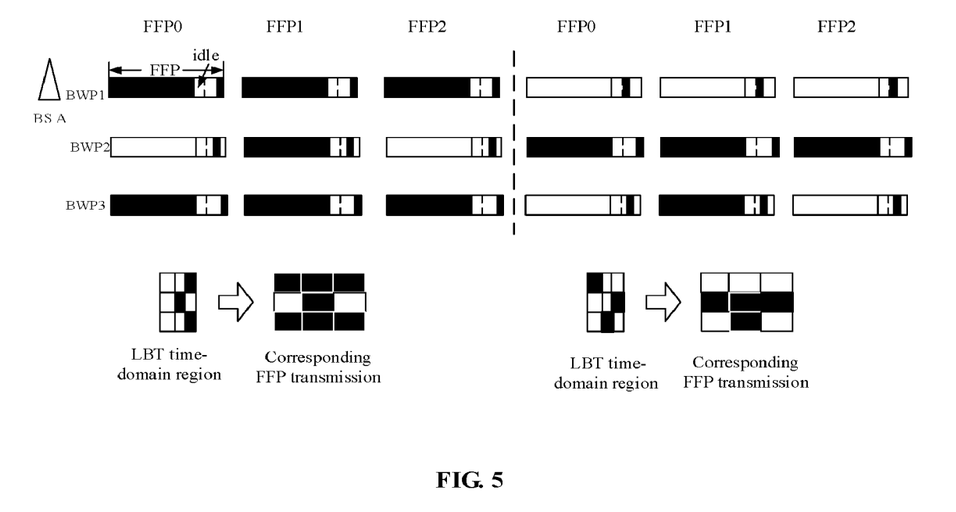
FIG. 5 illustrates a schematic diagram of two-dimensional FFP transmission mode information according to an exemplary embodiment.
Figure 6:
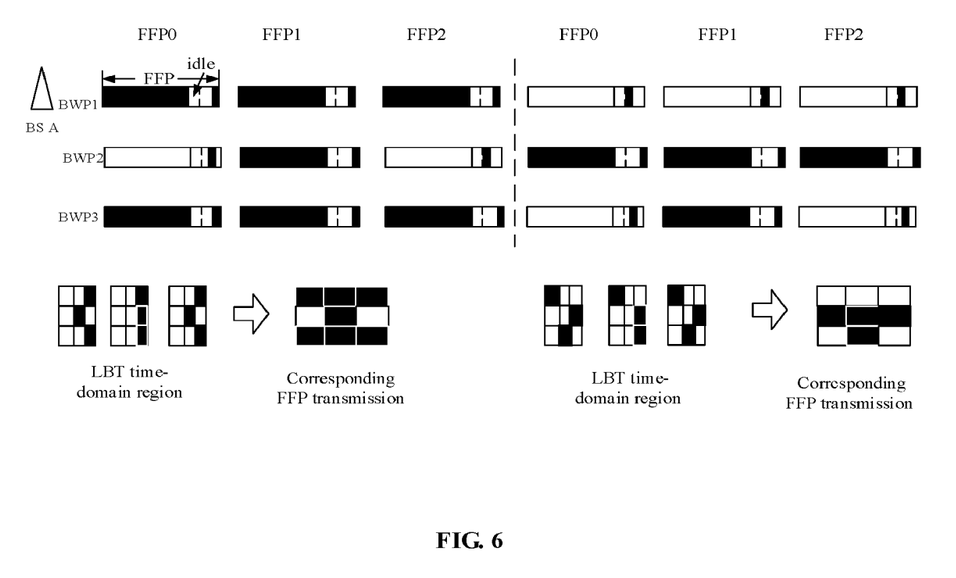
FIG. 6 illustrates a schematic diagram of two-dimensional extension FFP transmission mode information according to an exemplary embodiment.

When data transmission is needed, the apparatus for transmitting data may monitor, based on an LBT mechanism, a data transmission of a first base station in a preset LBT time-frequency region in at least one FFP. During this process, the number of monitored FFPs is set by the second base station. The apparatus for transmitting data determines the FFP transmission mode of the first base station by monitoring the data transmission of the first base station in the preset LBT time-frequency region in at least one FFP, thereby avoiding interferences based on the FFP transmission mode of the first base station. Referring to FIGS. 4, 5 and 6, the apparatus for transmitting data monitors data transmissions of the first base station in three preset LBT time-frequency regions in an FFP0, an FFP1 and an FFP2.

In step S304, the apparatus for transmitting data determines FFP transmission mode information of the first base station based on a monitoring result on each time-frequency sub-region in the preset LBT time-frequency region in each FFP. The FFP transmission mode information is in correspondence to a combination of occupancy states of respective time-frequency sub-regions in the preset LBT time-frequency region in the at least one FFP. The occupancy state refers to a state in which it is monitored that the first base station is performing the data transmission. That is, if it is monitored that the first base station is performing the data transmission in any one of the time-frequency sub-regions in the preset LBT time-frequency region in any FFP, the time-frequency sub-region is determined to be in the occupancy state.

Specifically, when the apparatus for transmitting data determines the FFP transmission mode information of the first base station based on the monitoring result on each time-frequency sub-region in the preset LBT time-frequency region in each FFP, the following steps may be performed.

In step 305, the apparatus for transmitting data determines a combination of occupancy states of respective time-frequency sub-regions in the preset LBT time-frequency region in the at least one FFP according to a preset rule based on the monitoring result on each time-frequency sub-region in the preset LBT time-frequency region in each FFP. The preset rule is intended to indicate a corresponding relationship between the monitoring results on the respective time-frequency sub-regions in the preset LBT time-frequency region in the at least one FFP and the combination of the occupancy states of the respective time-frequency sub-regions in the preset LBT time-frequency region in the at least one FFP. The preset rule is set by the second base station in advance.

In an embodiment of the present disclosure, the preset rule is that when it is monitored that the first base station is performing the data transmission in time-frequency sub-regions at specified positions in the preset LBT time-frequency region in any FFP, the occupancy states of the time-frequency sub-regions at the specified positions in the preset LBT time-frequency region in at least one FFP is combined to determine that the time-frequency sub-regions at the specified positions are in an occupancy state after combination. For example, in a left panel of FIG. 4, when a data transmission operation of the first base station is monitored on any of the left time-frequency sub-regions in the preset LBT time-frequency regions in an FFP0, an FFP1, and an FFP2, the occupancy states of the left time-frequency sub-regions in the preset LBT time-frequency regions in the FFP0, FFP1 and FFP2 is combined to determine that the left time-frequency sub-regions are in an occupancy state after the combination.

In another embodiment of the present disclosure, the preset rule is also that when it is monitored that the first base station is performing the data transmission in time-frequency sub-regions at specified positions in preset LBT time-frequency regions in at least two FFPs, the occupancy states of the time-frequency sub-regions at the specified positions in the preset LBT time-frequency region in at least one FFP is combined to determine that the time-frequency sub-regions at the specified positions are in an occupancy state after combination. In the left panel of FIG. 4, when a data transmission operation of the first base station is monitored on left time-frequency sub-regions in preset LBT time-frequency regions in at least two of FFP0, FFP1, and FFP2, the occupancy states of the left time-frequency sub-regions in the preset LBT time-frequency regions in the FFP0, FFP1 and FFP2 is combined to determine that the left time-frequency sub-regions are in an occupancy state after the combination.

In another embodiment of the present disclosure, the preset rule is also that when it is monitored that the first base station is performing the data transmission in time-frequency sub-regions at specified positions in preset LBT time-frequency regions in all the FFPs, the occupancy states of the time-frequency sub-regions at the specified positions in the preset LBT time-frequency region in at least one of the FFPs is combined to determine that the time-frequency sub-regions at the specified positions are in an occupancy state after combination. In the left panel of FIG. 4, when a data transmission operation of the first base station is monitored on left time-frequency sub-regions in preset LBT time-frequency regions in an FFP0, an FFP1, and an FFP2, the occupancy states of the left time-frequency sub-regions in the preset LBT time-frequency regions in the FFP0, FFP1 and FFP2 is combined to determine that the left time-frequency sub-regions are in an occupancy state after the combination.

Certainly, the preset rule further includes other content, which are not described one by one here.

After the preset rule is set, the second base station transmits the preset rule to each terminal in the second base station by broadcast signaling, physical layer control signaling, upper-layer radio resource control (RRC) signaling, or media access control (MAC) control element (CE) signaling, such that each terminal can determine the FFP transmission mode information of the first base station when monitoring a data transmission process of the first base station in the preset LBT time-frequency region in the FFP.

The apparatus for transmitting data determines, based on the preset rule set in advance, a combination of occupancy states of respective time-frequency sub-regions in the preset LBT time-frequency region in the at least one FFP based on the monitoring result on each time-frequency sub-region in the preset LBT time-frequency region in each FFP. For example, referring to FIG. 4, the preset rule is set to be that when it is monitored that the first base station is performing the data transmission in a time-frequency sub-region at a specified position in a preset LBT time-frequency region in any FFP, the occupancy states of the time-frequency sub-region at the specified position in the preset LBT time-frequency region in at least one FFP is combined to determine that the time-frequency sub-region at the specified position is in an occupancy state after combination. According to the set preset rule, for the left panel of FIG. 4, the apparatus for transmitting data monitors data transmissions of the first base station in preset LBT time-frequency regions in an FFP0, an FFP1, and an FFP2, and when a data transmission operation is monitored on right time-frequency sub-regions in the preset LBT time-frequency region in any of the FFP0, FFP1 and FFP2, the apparatus for transmitting data combines occupancy states of the right time-frequency sub-regions in the preset LBT time-frequency regions in the FFP0, FFP1, and FFP2, to determine that the right time-frequency sub-regions are in an occupancy state after combination. For the right panel of FIG. 4, the apparatus for transmitting data monitors data transmissions in preset LBT time-frequency regions in an FFP0, an FFP1, and an FFP2; and when a data transmission operation is monitored on middle time-frequency sub-regions in the preset LBT time-frequency region in any of the FFP0, FFP1 and FFP2, the apparatus for transmitting data combines occupancy states of the middle time-frequency sub-regions in the preset LBT time-frequency regions in the FFP0, FFP1, and FFP2, to determine that the middle time-frequency sub-regions are in an occupancy state after combination.

In 3042, the apparatus for transmitting data determines the FFP transmission mode information of the first base station according to the combination of the occupancy states of the respective time-frequency sub-regions in the preset LBT time-frequency region in the at least one FFP.

In an embodiment of the present disclosure, the FFP transmission mode information includes one-dimensional FFP transmission mode information, two-dimensional FFP transmission mode information, or two-dimensional extension FFP transmission mode information, and the like. The one-dimensional FFP transmission mode information is intended to characterize the combination of the occupancy states of time-frequency sub-regions with the same relative position in the preset LBT time-frequency region in the at least one FFP and in the same frequency band, of the first base station. Referring to FIG. 4, the FFP transmission mode information in the left panel of FIG. 4 characterizes the combination of occupancy states of the right time-frequency sub-regions in the preset LBT time-frequency regions in three FFPs including FFP0, FFP1 and FFP2 and in a frequency band SWP1, of the base station A. The FFP transmission mode information in the right panel of FIG. 4 characterizes the combination of occupancy states of the middle time-frequency sub-regions in the preset LBT time-frequency regions in three FFPs including FFP0, FFP1 and FFP2 and in a frequency band SWP1, of the base station A.

The two-dimensional FFP transmission mode information is extended in a frequency domain based on the one-dimensional FFP transmission mode information. At this point, the two-dimensional FFP transmission mode information is intended to characterize the combination of the occupancy states of time-frequency sub-regions with the same relative position in the preset LBT time-frequency region in the at least one FFP and in at least more than two frequency bands, of the first base station. Referring to FIG. 5, the FFP transmission mode information in the left panel of FIG. 5 characterizes the combination of occupancy states of right time-frequency sub-regions in preset LBT time-frequency regions in three FFPs including FFP0, FFP1 and FFP2 and in a frequency band SWP1, the combination of occupancy states of middle time-frequency sub-regions in preset LBT time-frequency regions in three FFPs including FFP0, FFP1 and FFP2 and in a frequency band SWP2, and the combination of occupancy states of right time-frequency sub-regions in preset LBT time-frequency regions in three FFPs including FFP0, FFP1 and FFP2 and in a frequency band SWP3, of the first base station. The FFP transmission mode information in the right panel of FIG. 5 characterizes the combination of occupancy states of middle time-frequency sub-regions in preset LBT time-frequency regions in three FFPs including FFP0, FFP1 and FFP2 and in a frequency band SWP1, the combination of occupancy states of right time-frequency sub-regions in preset LBT time-frequency regions in three FFPs including FFP0, FFP1 and FFP2 and in a frequency band SWP2, and the combination of occupancy states of middle time-frequency sub-regions in preset LBT time-frequency regions in three FFPs including FFP0, FFP1 and FFP2 and in a frequency band SWP3, of the first base station. The two-dimensional FFP transmission mode information is also extended in a time domain according to the one-dimensional FFP transmission mode information. At this point, the two-dimensional FFP transmission mode information is intended to characterize the combination of the occupancy states of time-frequency sub-regions with different relative positions in the preset LBT time-frequency region in the at least one FFP and in the same frequency band, of the first base station. The two-dimensional FFP transmission mode information requires monitoring the apparatus for transmitting data at different frequencies, therefore, the monitoring is highly complex.

The two-dimensional extension FFP transmission mode information is extended in a time domain and a frequency domain according to the one-dimensional FFP transmission mode information. The two-dimensional extension FFP transmission mode information is intended to characterize the combination of the occupancy states of time-frequency sub-regions with different relative positions in the preset LBT time-frequency region in the at least one FFP and in at least two frequency bands, of the first base station. Referring to FIG. 6, the FFP transmission mode information in the left panel of FIG. 6 characterizes the combination of occupancy states of right time-frequency sub-regions in preset LBT time-frequency regions in three FFPs including FFP0, FFP1 and FFP2 and in a frequency band SWP1, the combination, in a frequency band SWP2, of occupancy states of left time-frequency sub-regions in a preset LBT time-frequency region in an FFP0, right time-frequency sub-regions in a preset LBT time-frequency region in an FFP1, and left time-frequency sub-regions in a preset LBT time-frequency region in an FFP2, and the combination of occupancy states of right time-frequency sub-regions in preset LBT time-frequency regions in three FFPs including FFP0, FFP1 and FFP2 and in a frequency band SWP3, of the first base station. The FFP transmission mode information in the right panel of FIG. 6 characterizes the combination of occupancy states of left time-frequency sub-regions in preset LBT time-frequency regions in three FFPs including FFP0, FFP1 and FFP2 and in a frequency band SWP1, the combination of occupancy states of right time-frequency sub-regions in preset LBT time-frequency regions in three FFPs including FFP0, FFP1 and FFP2 and in a frequency band SWP2, and the combination, in a frequency band SWP3, of occupancy states of middle time-frequency sub-regions in a preset LBT time-frequency region in an FFP0, right time-frequency sub-regions in a preset LBT time-frequency region in an FFP1, and middle time-frequency sub-regions in a preset LBT time-frequency region in an FFP2, of the first base station. The two-dimensional extension FFP transmission mode information requires monitoring the apparatus for transmitting data in different time domains and at different frequencies, therefore the monitoring is the most complex.

In S305, the apparatus for transmitting data determines an FFP transmission mode of the first base station according to the FFP transmission mode information. In this embodiment of the present disclosure, each type of FFP transmission mode information is in correspondence to one type of FFP transmission mode of the first base station. Therefore, the apparatus for transmitting data determines the FFP transmission mode of the first base station based on the FFP transmission mode information. Specifically, the apparatus for transmitting data acquires an FFP transmission mode of the first base station by mapping according to a preset mapping relationship and based on the FFP transmission mode information. The preset mapping relationship may be set by the second base station, and specifies an FFP occupancy condition represented by each time-frequency sub-region after the combination. In fact, the preset mapping relationship indicates a corresponding relationship between the FFP transmission mode information and the FFP transmission mode.

Referring to FIG. 4, the preset mapping relationship indicates that, after the combination, the left time-frequency sub-region represent no occupation of the FFPs, the middle time-frequency sub-regions represent the occupation of one-third of the FFPs, and the right sub-regions represent the occupation of all the FFPs. According to the preset mapping relationship, the apparatus for transmitting data maps the FFP transmission mode information illustrated in the left panel of FIG. 4 to acquire a FFP transmission mode in which three FFPs are occupied, and the apparatus for transmitting data maps the FFP transmission mode information illustrated in the right panel of FIG. 4 to acquire a FFP transmission mode in which the middle FFP is occupied. Further, when the preset mapping relationship is set, the second base station also transmits the preset mapping relationship to each terminal in the second base station by broadcast signaling, physical layer control signaling, upper-layer RRC signaling, or MAC CE signaling.

In another embodiment of the present disclosure where the apparatus for transmitting data is the second base station, after the apparatus for transmitting data determines the FFP transmission mode of the first base station based on the FFP transmission mode information, the FFP transmission mode of the second base station is also determined according to the FFP transmission mode of the first base station. By determining the FFP transmission mode of the second base station according to the FFP transmission mode of the first base station, interferences from the first base station can be avoided, thereby improving the success rate in data transmission.

In an embodiment of the present disclosure where the apparatus for transmitting data is a terminal in the second base station, the apparatus for transmitting data also sends the FFP transmission mode information to the second station. After receiving the FFP transmission mode information, the second base station determines the FFP transmission mode of the first base station according to a preset mapping relationship, and further adjusts the FFP transmission mode of the second base station according to the FFP transmission mode of the first base station. As a result, all the time-frequency positions at which the first base station is performing the data transmission can be avoided, thereby improving the success rate in data transmission.

In an embodiment of the present disclosure where the apparatus for transmitting data is a terminal in the second base station, the apparatus for transmitting data also sends the FFP transmission mode of the first base station to the second station, so that the second base station adjusts the FFP transmission mode thereof according to the FFP transmission mode of the first base station. As a result, all the time-frequency positions at which the first base station is performing the data transmission can be avoided to improve the success rate in data transmission.

In another embodiment of the present disclosure where the apparatus for transmitting data is a terminal in the second base station, after the apparatus for transmitting data determines the FFP transmission mode of the first base station based on the FFP transmission mode information, a data transmission request sent to the second base station is further adjusted according to the FFP transmission mode of the first base station, such that interferences from the first base station can be avoided, thereby improving the success rate in data transmission.

In another embodiment of the present disclosure, when the first base station transmits data in the FFP, a transmitted data packet includes uplink data, downlink data and uplink and downlink data. Depending on the data type of the transmitted data, the FFP transmission mode of the first base station includes an FFP uplink transmission mode, an FFP downlink transmission mode, and an FFP uplink and downlink transmission mode. The FFP uplink transmission mode refers to a mode where the first base station is monitored for uplink data that is transmitted in a preset LBT time-frequency region in an FFP; the FFP downlink transmission mode refers to a mode where the first base station is monitored for downlink data that is transmitted in the preset LBT time-frequency region in the FFP, and the FFP uplink and downlink transmission mode refers to a mode where the first base station is monitored for uplink and downlink data that is transmitted in the preset LBT time-frequency region in the FFP.

The second base station determines an interference type of the first base station by classifying the FFP transmission mode of the first base station, thereby making a further scheduling judgment according to the interference type. For example, if the first base station is the FFP uplink transmission mode, the second base station may choose an FFP in which the uplink data transmission of the first base station is avoided, if the first base station is the FFP downlink transmission mode, the second base station may choose an FFP in which the downlink data transmission of the first base station is avoided, and if the first base station is the FFP uplink and downlink transmission mode, the second base station may choose an FFP in which the uplink and downlink data transmission of the first base station is avoided.

According to the method provided by the embodiments of the present disclosure, the FFP transmission mode information of the first base station is determined by monitoring the data transmission of the first base station in the preset LBT time-frequency region in at least one FFP, and the FFP transmission mode of the first base station is determined according to the FFP transmission mode information. With the method, the FFP transmission mode of other adjacent base stations can be acquired without signaling interaction between the base stations, such that transmission scheduling is enabled in a fashion of interference avoidance.

Figure 7:
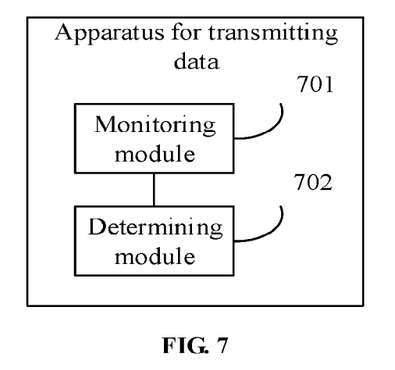
FIG. 7 illustrates a block diagram of an apparatus for transmitting data according to an exemplary embodiment.

FIG. 7 illustrates a schematic diagram of an apparatus for transmitting data according to an exemplary embodiment. Referring to FIG. 7, the apparatus includes a monitoring module 701 and a determining module 702. Of course, it should be understood that one or more of the modules described in this disclosure can be implemented by hardware, such as circuitry.

The monitoring module 701 is configured to monitor a data transmission of a first base station in a preset LBT time-frequency region in at least one FFP, wherein the preset LBT time-frequency region includes at least one time-frequency sub-region.

The determining module 702 is configured to determine FFP transmission mode information of the first base station based on a monitoring result on each time-frequency sub-region in the preset LBT time-frequency region in each FFP, wherein the FFP transmission mode information is in correspondence to a combination of occupancy states of respective time-frequency sub-regions in the preset LBT time-frequency region in the at least one FFP, and the occupancy state refers to a state in which it is monitored that the first base station is performing the data transmission. The determining module 702 is further configured to determine an FFP transmission mode of the first base station based on the FFP transmission mode information.

In another embodiment of the present disclosure, the apparatus for transmitting data includes a second base station or a terminal in the second base station, and the second base station is a base station that is adjacent to the first base station and interferes with the first base station.

In another embodiment of the present disclosure, the apparatus further includes a synchronizing module. The synchronizing module can be configured to time-synchronize with the first base station in advance.

In another embodiment of the present disclosure, the determining module 702 is configured to determine the combination of occupancy states of respective time-frequency sub-regions in the preset LBT time-frequency region in the at least one FFP according to a preset rule and based on the monitoring result on each time-frequency sub-region in the preset LBT time-frequency region in each FFP, wherein the preset rule is intended to indicate a corresponding relationship between the monitoring results on the respective time-frequency sub-regions in the preset LBT time-frequency region in the at least one FFP and the combination of the occupancy states of the respective time-frequency sub-regions in the preset LBT time-frequency region in the at least one FFP; and the determining module is configured to determine the FFP transmission mode information of the first base station according to the combination of the occupancy states of the respective time-frequency sub-regions in the preset LBT time-frequency region in the at least one FFP.

In another embodiment of the present disclosure, the FFP transmission mode information includes one-dimensional FFP transmission mode information, two-dimensional FFP transmission mode information, or two-dimensional extension FFP transmission mode information. The one-dimensional FFP transmission mode information can be intended to characterize the combination of the occupancy states of time-frequency sub-regions with the same relative position in the preset LBT time-frequency region in the at least one FFP and in the same frequency band, of the first base station. The two-dimensional FFP transmission mode information is intended to characterize the combination of the occupancy states of time-frequency sub-regions with the same relative position in the preset LBT time-frequency region in the at least one FFP and in at least two frequency bands, of the first base station, or the two-dimensional FFP transmission mode information is intended to characterize the combination of the occupancy states of time-frequency sub-regions with different relative positions in the preset LBT time-frequency region in the at least one FFP and in the same frequency band, of the first base station. The two-dimensional extension FFP transmission mode information is intended to characterize the combination of the occupancy states of time-frequency sub-regions with different relative positions in the preset LBT time-frequency region in the at least one FFP and in at least two frequency bands, of the first base station.

In another embodiment of the present disclosure, the determining module 702 is configured to acquire the FFP transmission mode of the first base station by mapping according to a preset mapping relationship based on the FFP transmission mode information, wherein the preset mapping relationship is intended to indicate a corresponding relationship between the FFP transmission mode information and the FFP transmission mode.

In another embodiment of the present disclosure, when the apparatus for transmitting data is the terminal in the second base station, the apparatus further can further include a sending module. The sending module is configured to send the FFP transmission mode information to the second base station, wherein the second base station determines the FFP transmission mode of the first base station based on the FFP transmission mode information and adjust an FFP transmission mode of the second base station according to the FFP transmission mode of the first base station, or the sending module is configured to send the FFP transmission mode of the first base station to the second base station, wherein the second base station adjusts the FFP transmission mode of the second base station according to the FFP transmission mode of the first base station.

In another embodiment of the present disclosure, when the apparatus for transmitting data is the terminal in the second base station, the apparatus can further include an adjusting module. The adjusting module is configured to adjust a data transmission request sent to the second base station according to the FFP transmission mode of the first base station.

In another embodiment of the present disclosure, when the apparatus for transmitting data is the second base station, the determining module 702 is configured to determine an FFP transmission mode of the second base station according to the FFP transmission mode of the first base station.

In another embodiment of the present disclosure, the preset LBT time-frequency region includes at least one frequency band, the at least one frequency band including a carrier component CC frequency band, a bandwidth part BWP frequency band or a resource block RB.

In another embodiment of the present disclosure, the FFP transmission mode of the first base station includes an FFP uplink transmission mode, an FFP downlink transmission mode, and an FFP uplink and downlink transmission mode.

According to the apparatus provided by the embodiments of the present disclosure, the FFP transmission mode information of the first base station is determined by monitoring the data transmission of the first base station in the preset LBT time-frequency region in at least one FFP, and the FFP transmission mode of the first base station is determined according to the FFP transmission mode information. With the apparatus, the FFP transmission mode of other adjacent base stations can be acquired without signaling interaction between the base stations, such that transmission scheduling is enabled in a fashion of interference avoidance.

With respect to the apparatus in the embodiments above, the specific manner of respective modules to execute the operation has been described in detail in the embodiments related to this method, and a detailed description thereof will not be repeated here.

Figure 8:
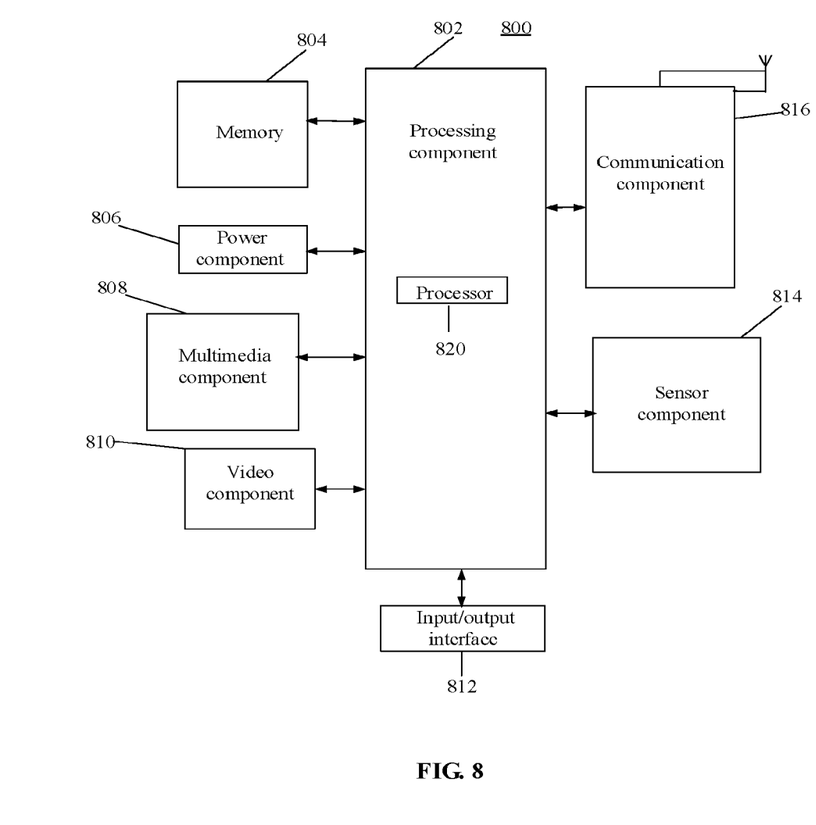
FIG. 8 illustrates a block diagram of a device for transmitting data according to an exemplary embodiment.

FIG. 8 illustrates a block diagram of a device 800 for transmitting data according to an exemplary embodiment. For example, the device 800 is a mobile phone, a computer, a digital broadcasting terminal, a message receiving and transmitting device, a game console, a tablet device, medical equipment, fitness equipment, a personal digital assistant, and the like.

Referring to FIG. 8, the device 800 includes one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the device 800, such as the operations associated with display, telephone calls, data communications, camera operations, and recording operations. The processing component 802 includes one or more processors 820 to execute instructions, so as to perform all or part of the steps in the above-described methods. Moreover, the processing component 802 includes one or more modules which facilitate the interaction between the processing component 802 and other components. For instance, the processing component 802 includes a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, videos, etc. The memory 804 is implemented by any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 includes a power management system, one or more power sources, and any other components associated with the generation, management, and distribution of power for the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the time duration and a pressure associated with the touch or swipe action. In some embodiments, the multimedia component 808 includes a front camera and/or a rear camera. The front camera and the rear camera receive external multimedia data while the device 800 is in an operation mode, such as a photographing mode or a video mode. Each of the front camera and the rear camera is a fixed optical lens system or have focus and optical zoom capability.

The audio component 810 is configured to output and/or input audio signals. For example, the audio component 810 includes a microphone (MIC) configured to receive external audio signals when the device 800 is in an operation mode, such as a call mode, a recording mode, and a voice recognition mode. The received audio signal is further stored in the memory 804 or transmitted via the communication component 816. In some embodiments, the audio component 810 further includes a speaker for outputting audio signals.

The I/O interface 812 provides an interface between the processing component 802 and peripheral interface modules, such as a keyboard, a click wheel, buttons, and the like. The buttons include, but are not limited to, a home button, a volume button, a start button, and a lock button.

The sensor component 814 includes one or more sensors to provide state assessments of various aspects of the device 800. For instance, the sensor component 814 detects an open/closed state of the device 800 and relative positioning of components, for example, the display device and the mini-keypad, of the device 800, a change in position of the device 800 or a component of the device 800, a presence or absence of user contact with the device 800, an orientation or an acceleration/deceleration of the device 800, and a change in temperature of the device 800 can be detected by the sensor component 814. The sensor component 814 includes a proximity sensor configured to detect the presence of nearby objects without any physical contact. The sensor component 814 further includes a light sensor, such as a CMOS or CCD image sensor, used for imaging applications. In some embodiments, the sensor component 814 further includes an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 accesses a wireless network based on any communication standard, such as Wi-Fi, 2G, 3G, 4G or 5G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications.

In exemplary embodiments, the device 800 is implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-described methods.

In an exemplary embodiment, a non-transitory computer-readable storage medium including at least one instruction (such as a memory 804 including at least one instruction) is further provided. The at least one instruction, may be executed by a processor 820 of the device 800 to complete the above-described methods. For example, the non-transitory computer-readable storage medium is a read-only memory (ROM), a random access memory (RAM), a CD-ROM, a magnetic tape, a floppy disk, an optical data storage device, and the like.

A non-transitory computer-readable storage medium stores at least one instruction therein, wherein the at least one instruction, when executed by a processor of a mobile terminal, enables the mobile terminal to perform a method for transmitting data.

According to the device provided by the embodiments of the present disclosure, the FFP transmission mode information of the first base station is determined by monitoring the data transmission of the first base station in the preset LBT time-frequency region in at least one FFP, and the FFP transmission mode of the first base station is determined according to the FFP transmission mode information. With the device, the FFP transmission mode of other adjacent base stations can be acquired without signaling interaction between the base stations, such that transmission scheduling is enabled in a fashion of interference avoidance.

Other embodiments of the present disclosure are apparent to those skilled in the art from consideration of the specification and practice of the present disclosure. This disclosure is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It is appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A method for transmitting data, performed by a device for transmitting data, the method comprising:
monitoring a data transmission of a first base station in a preset listen before talk (LBT) time-frequency region in at least one fixed frame period (FFP), the preset LBT time-frequency region including at least one time-frequency sub-region;
determining FFP transmission mode information of the first base station based on a monitoring result on each time-frequency sub-region in the preset LBT time-frequency region in each FFP, the FFP transmission mode information being in correspondence to a combination of occupancy states of respective time-frequency sub-regions in the preset LBT time-frequency region in the at least one FFP, and the occupancy state being a state in which it is monitored that the first base station is performing the data transmission; and
determining an FFP transmission mode of the first base station based on the FFP transmission mode information, the FFP transmission mode information comprising one-dimensional FFP transmission mode information, two-dimensional FFP transmission mode information, or two-dimensional extension FFP transmission mode information, wherein:
the one-dimensional FFP transmission mode information is intended to characterize the combination of the occupancy states of time-frequency sub-regions with the same relative position in the preset LBT time-frequency region in the at least one FFP and in the same frequency band of the first base station,
the two-dimensional FFP transmission mode information is intended to characterize one of the combination of the occupancy states of time-frequency sub-regions with the same relative position in the preset LBT time-frequency region in the at least one FFP and in at least two frequency bands of the first base station, and the combination of the occupancy states of time-frequency sub-regions with different relative positions in the preset LBT time-frequency region in the at least one FFP and in the same frequency band of the first base station, and
the two-dimensional extension FFP transmission mode information is intended to characterize the combination of the occupancy states of time-frequency sub-regions with different relative positions in the preset LBT time-frequency region in the at least one FFP and in at least two frequency bands of the first base station.

2. The method according to claim 1, wherein the device for transmitting data comprises a second base station or a terminal in the second base station, the second base station being a base station that is adjacent to the first base station and interferes with the first base station.

3. The method according to claim 2, wherein, when the device for transmitting data is the terminal in the second base station, the method further comprises one of:
sending the FFP transmission mode information to the second base station, the second base station determining the FFP transmission mode of the first base station based on the FFP transmission mode information and adjusting an FFP transmission mode of the second base station based on the FFP transmission mode of the first base station; or
sending the FFP transmission mode of the first base station to the second base station, the second base station adjusting the FFP transmission mode of the second base station based on the FFP transmission mode of the first base station.

4. The method according to claim 2, wherein:
when the device for transmitting data is the terminal in the second base station, after determining the FFP transmission mode of the first base station based on the FFP transmission mode information, the method further comprises adjusting a data transmission request sent to the second base station based on the FFP transmission mode of the first base station, or
when the device for transmitting data is the second base station, after determining the FFP transmission mode of the first base station based on the FFP transmission mode information, the method further comprises: determining an FFP transmission mode of the second base station according to the FFP transmission mode of the first base station.

5. The method according to claim 1, wherein before monitoring the data transmission of the first base station in the preset LBT time-frequency region in the at least one FFP, the method further comprises:

time-synchronizing the device for transmitting data with the first base station in advance.

6. The method according to claim 1, wherein determining the FFP transmission mode information of the first base station based on the monitoring result on each time-frequency sub-region in the preset LBT time-frequency region in each FFP further comprises:
determining the combination of occupancy states of respective time-frequency sub-regions in the preset LBT time-frequency region in the at least one FFP based on a preset rule and the monitoring result on each time-frequency sub-region in the preset LBT time-frequency region in each FFP, the preset rule being intended to indicate a corresponding relationship between the monitoring results on the respective time-frequency sub-regions in the preset LBT time-frequency region in the at least one FFP and the combination of the occupancy states of the respective time-frequency sub-regions in the preset LBT time-frequency region in the at least one FFP; and
determining the FFP transmission mode information of the first base station based on the combination of the occupancy states of the respective time-frequency sub-regions in the preset LBT time-frequency region in the at least one FFP.

7. The method according to claim 1, wherein determining the FFP transmission mode of the first base station based on the FFP transmission mode information further comprises:
acquiring the FFP transmission mode of the first base station by mapping based on a preset mapping relationship and the FFP transmission mode information, the preset mapping relationship being intended to indicate a corresponding relationship between the FFP transmission mode information and the FFP transmission mode.

8. The method according to claim 1, wherein the preset LBT time-frequency region comprises at least one frequency band that includes a carrier component (CC) frequency band, a bandwidth part (BWP) frequency band, or a resource block (RB).

9. The method according to claim 1, wherein the FFP transmission mode of the first base station comprises an FFP uplink transmission mode, an FFP downlink transmission mode, and an FFP uplink and downlink transmission mode.

10. A device for transmitting data, comprising:
a processor;
a memory that is configured to store at least one instruction executable by the processor,
wherein, when executed by the processor, the at least one instruction causes the processor to perform a method for transmitting data, and the method comprising:
monitoring a data transmission of a first base station in a preset listen before talk (LBT) time-frequency region in at least one fixed frame period (FFP), the preset LBT time-frequency region including at least one time-frequency sub-region;
determining FFP transmission mode information of the first base station based on a monitoring result on each time-frequency sub-region in the preset LBT time-frequency region in each FFP, the FFP transmission mode information being in correspondence to a combination of occupancy states of respective time-frequency sub-regions in the preset LBT time-frequency region in the at least one FFP, and the occupancy state referring to a state in which it is monitored that the first base station is performing the data transmission; and determining an FFP transmission mode of the first base station based on the FFP transmission mode information, the FFP transmission mode information comprising one-dimensional FFP transmission mode information, two-dimensional FFP transmission mode information, or two-dimensional extension FFP transmission mode information, wherein:

the one-dimensional FFP transmission mode information is intended to characterize the combination of the occupancy states of time-frequency sub-regions with the same relative position in the preset LBT time-frequency region in the at least one FFP and in the same frequency band of the first base station, the two-dimensional FFP transmission mode information is intended to characterize one of the combination of the occupancy states of time-frequency sub-regions with the same relative position in the preset LBT time-frequency region in the at least one FFP and in at least two frequency bands of the first base station, or the combination of the occupancy states of time-frequency sub-regions with different relative positions in the preset LBT time-frequency region in the at least one FFP and in the same frequency band of the first base station, and the two-dimensional extension FFP transmission mode information is intended to characterize the combination of the occupancy states of time-frequency sub-regions with different relative positions in the preset LBT time-frequency region in the at least one FFP and in at least two frequency bands of the first base station.

11. The device according to claim 10, further comprising a second base station or a terminal in the second base station, the second base station being a base station that is adjacent to the first base station and interferes with the first base station.

12. The device according to claim 11, wherein, when the device for transmitting data is the terminal in the second base station, the processor further performs one of:

sending the FFP transmission mode information to the second base station, the second base station determining the FFP transmission mode of the first base station based on the FFP transmission mode information and adjusting an FFP transmission mode of the second base station according to the FFP transmission mode of the first base station; or sending the FFP transmission mode of the first base station to the second base station, the second base station adjusting the FFP transmission mode of the second base station based on the FFP transmission mode of the first base station.

13. The device according to claim 11, wherein:

when the device for transmitting data is the terminal in the second base station, after determining the FFP transmission mode of the first base station based on the FFP transmission mode information, the method further includes adjusting a data transmission request sent to the second base station according to the FFP transmission mode of the first base station, or when the device for transmitting data is the second base station, after determining the FFP transmission mode of the first base station based on the FFP transmission mode information, the method further includes determining an FFP transmission mode of the second base station according to the FFP transmission mode of the first base station.

14. The device according to claim 10, wherein the device is time-synchronized for transmitting data with the first base station in advance, before monitoring the data transmission of the first base station in the preset LBT time-frequency region in the at least one FFP.

15. The device according to claim 10, wherein determining the FFP transmission mode information of the first base station based on the monitoring result on each time-frequency sub-region in the preset LBT time-frequency region in each FFP further comprises:

determining the combination of occupancy states of respective time-frequency sub-regions in the preset LBT time-frequency region in the at least one FFP based on a preset rule and the monitoring result on each time-frequency sub-region in the preset LBT time-frequency region in each FFP, the preset rule being intended to indicate a corresponding relationship between the monitoring results on the respective time-frequency sub-regions in the preset LBT time-frequency region in the at least one FFP and the combination of the occupancy states of the respective time-frequency sub-regions in the preset LBT time-frequency region in the at least one FFP; and determining the FFP transmission mode information of the first base station based on the combination of the occupancy states of the respective time-frequency sub-regions in the preset LBT time-frequency region in the at least one FFP.

16. The device according to claim 10, determining the FFP transmission mode of the first base station based on the FFP transmission mode information further comprising acquiring the FFP transmission mode of the first base station by mapping based on a preset mapping relationship and an occupancy state of each sub-region in the FFP transmission mode information, the preset mapping relationship being intended to indicate a corresponding relationship between the FFP transmission mode information and the FFP transmission mode.

17. The device according to claim 10, wherein the preset LBT time-frequency region comprises at least one frequency band that includes a carrier component CC frequency band, a bandwidth part BWP frequency band, or a resource block RB.

18. The device according to claim 10, wherein the FFP transmission mode of the first base station comprises an FFP uplink transmission mode, an FFP downlink transmission mode, and an FFP uplink and downlink transmission mode.

* * * * *